United States Patent
Yu et al.

(10) Patent No.: US 9,967,783 B2
(45) Date of Patent: May 8, 2018

(54) FACILITATING GROUP HANDOVER

(71) Applicant: NOKIA SOLUTIONS AND NETWORKS OY, Espoo (FI)

(72) Inventors: Ling Yu, Espoo (FI); Vinh Van Phan, Oulu (FI); Kari Veikko Horneman, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 265 days.

(21) Appl. No.: 14/767,327

(22) PCT Filed: Feb. 15, 2013

(86) PCT No.: PCT/EP2013/053105
§ 371 (c)(1),
(2) Date: Aug. 12, 2015

(87) PCT Pub. No.: WO2014/124689
PCT Pub. Date: Aug. 21, 2014

(65) Prior Publication Data
US 2015/0382252 A1    Dec. 31, 2015

(51) Int. Cl.
*H04W 36/00* (2009.01)
*H04W 8/00* (2009.01)
(Continued)

(52) U.S. Cl.
CPC ....... *H04W 36/0027* (2013.01); *H04W 8/005* (2013.01); *H04W 36/0055* (2013.01);
(Continued)

(58) Field of Classification Search
CPC ............. H04W 36/0027; H04W 8/005; H04W 36/0055; H04W 48/16; H04W 92/18; H04W 36/08
See application file for complete search history.

(56) References Cited

U.S. PATENT DOCUMENTS 6,628,620 B1    9/2003    Cain
7,532,607 B1    5/2009    Eslambolchi et al.
(Continued)

FOREIGN PATENT DOCUMENTS

EP    2384049 A1    11/2011
WO    2009/018251 A1    2/2009
(Continued)

OTHER PUBLICATIONS

International Search Report and Written Opinion for International Application No. PCT/EP2013/053105, dated Apr. 17, 2014, 20 pages.
(Continued)

*Primary Examiner* — Andrew Lai
*Assistant Examiner* — Harry H Kim
(74) *Attorney, Agent, or Firm* — Brake Hughes Bellermann LLP

(57) ABSTRACT

There is provided a method, including: receiving, by a target base station, information that a handover of a plurality of user equipment currently connected to a source cell is needed to a target cell; causing a device-to-device, D2D, cluster generation, wherein each generated D2D cluster is controlled by a predetermined user equipment connected to the target cell and acting as a D2D cluster head; determining D2D cluster-specific radio resource commitment information for each generated D2D cluster; indicating corresponding D2D cluster-specific radio resource commitment information to each D2D cluster head; and receiving a handover request from at least one D2D cluster head, wherein the handover request is for handing at least one member of the corresponding D2D cluster over to the target cell.

20 Claims, 7 Drawing Sheets

(51) Int. Cl.
   *H04W 48/16*   (2009.01)
   *H04W 36/08*   (2009.01)
   *H04W 92/18*   (2009.01)

(52) U.S. Cl.
   CPC ............ *H04W 48/16* (2013.01); *H04W 36/08* (2013.01); *H04W 92/18* (2013.01)

(56) References Cited

U.S. PATENT DOCUMENTS

| | | |
|---|---|---|
| 2010/0009675 A1 | 1/2010 | Wijting et al. |
| 2011/0063995 A1 | 3/2011 | Chen et al. |
| 2011/0268006 A1 | 11/2011 | Koskela et al. |
| 2012/0039308 A1 | 2/2012 | Kim et al. |
| 2012/0302240 A1* | 11/2012 | Tamaki ............ H04W 36/0011 455/436 |
| 2013/0130684 A1* | 5/2013 | Gomes ................. H04W 8/186 455/435.1 |

FOREIGN PATENT DOCUMENTS

| | | |
|---|---|---|
| WO | 2009/155992 A1 | 12/2009 |
| WO | 2011/123755 A1 | 10/2011 |
| WO | 2011/147462 A1 | 12/2011 |
| WO | 2011/156958 A1 | 12/2011 |
| WO | 2014/040617 A1 | 9/2012 |
| WO | 2014/000818 A1 | 1/2014 |
| WO | 2014/053183 A1 | 4/2014 |
| WO | 2014/063747 A1 | 5/2014 |

OTHER PUBLICATIONS

3GPP TS 36.423 V11.3.0 (Dec. 2012) "3rd Generation Partnership Project; Technical Specification Group Radio Access Network; Evolved Universal Terrestrial Radio Access Network (E-UTRAN); X2 application protocol (X2AP) (Release 11)"; 141 pages; 3rd Generation Partnership Project (3GPP); Mobile Competence Centre; 650, Route des Lucioles; F-06921 Sophia-Antipolis Cedex; France.

* cited by examiner

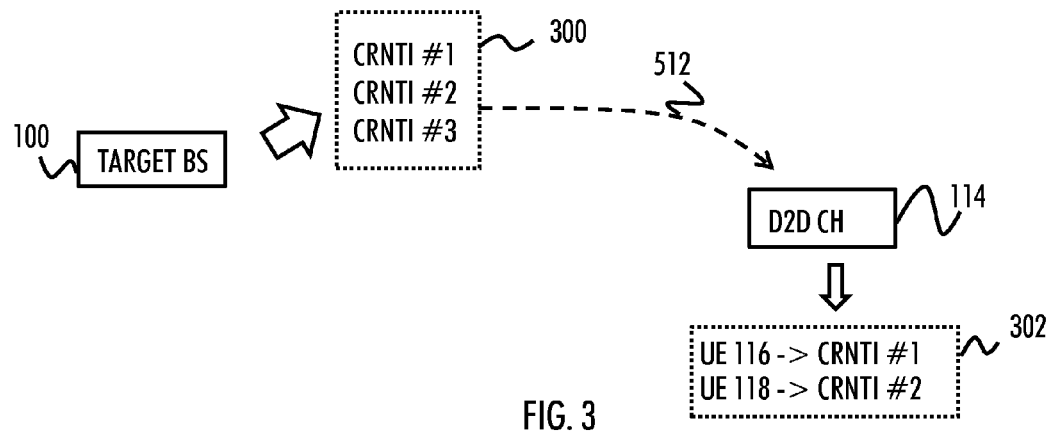
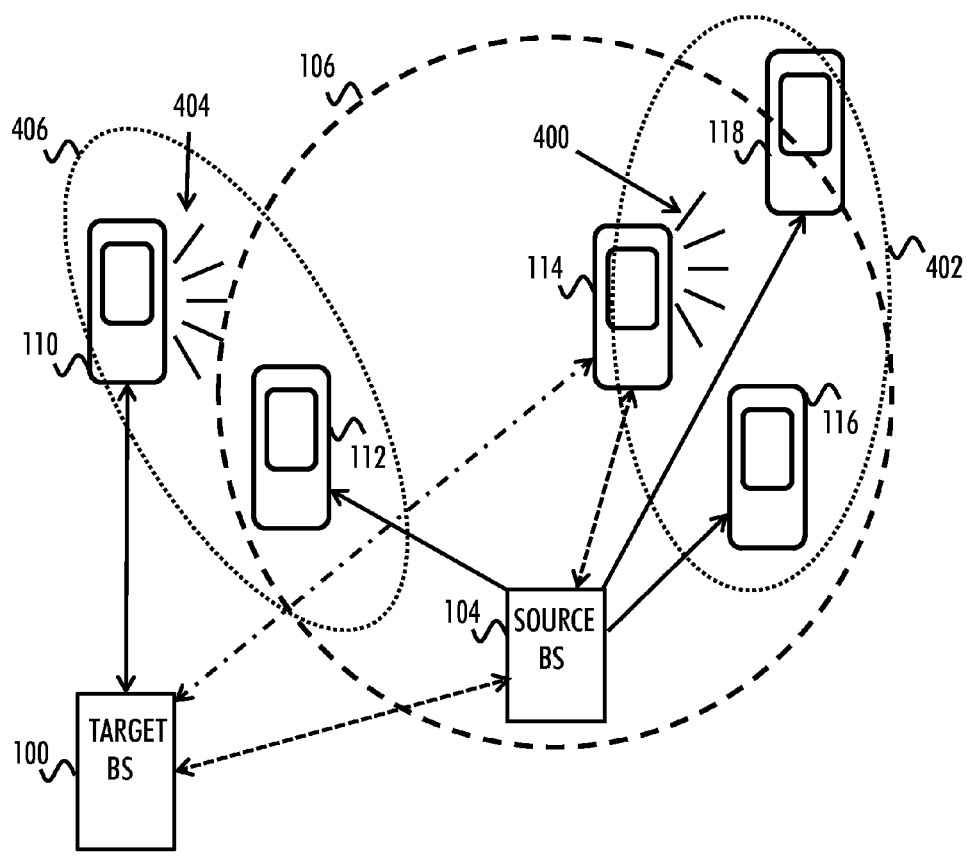
FIG. 3
FIG. 4

FACILITATING GROUP HANDOVER

This application is a national stage entry of PCT Application No. PCT/EP2013/053105, filed on Feb. 15, 2013, entitled "FACILITATING GROUP HANDOVER" which is hereby incorporated by reference in its entirety.

FIELD

The invention relates generally to mobile communication networks. More particularly, the invention relates to facilitating a group handover.

BACKGROUND

Occasionally it may be possible to apply available spectrum of another cell. While entering the new cell offering the available spectrum may be more flexible, a handover back to the original or neighboring cell when the spectrum is unavailable may not be. Such situation may require fast and reliable handover of a group of user equipments.

BRIEF DESCRIPTION OF THE INVENTION

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising means for performing any of the embodiments as described in the appended claims.

Some embodiments of the invention are defined in the dependent claims.

LIST OF DRAWINGS

In the following, the invention will be described in greater detail with reference to the embodiments and the accompanying drawings, in which FIG. 1 presents a network to which embodiments of the invention are applicable to;

FIG. 3 shows distribution of identifiers to the user terminals, according to an embodiment;

FIG. 4 shows some embodiments illustrating selections of a cluster head; and

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
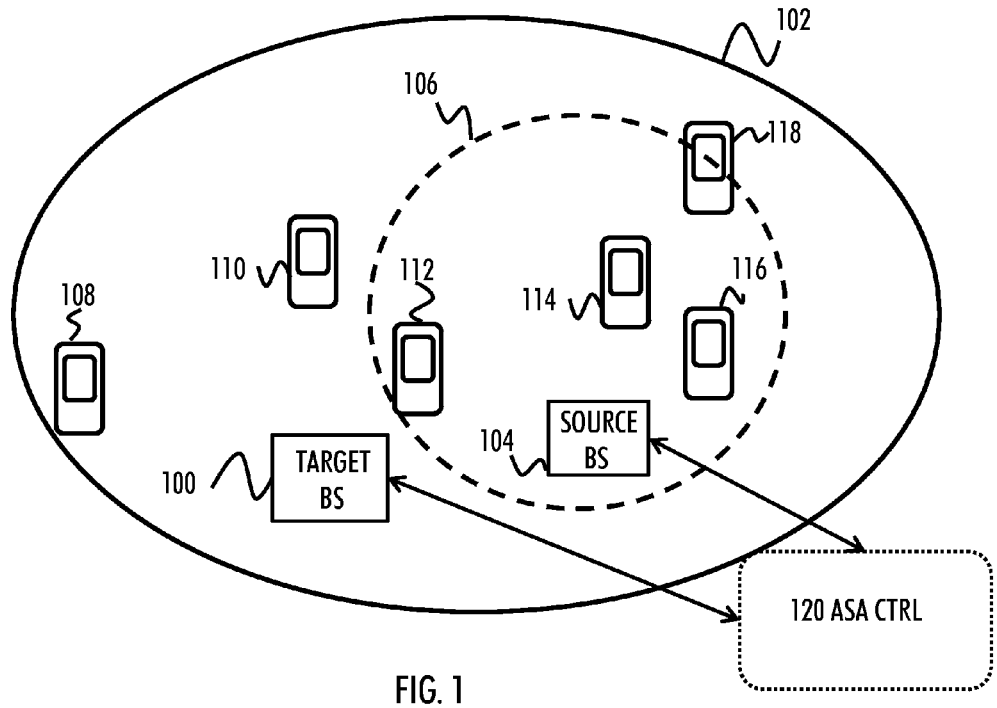

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio system, such as with at least one of the following: Worldwide Interoperability for Microwave Access (Wi-MAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A.

Typically the communication network comprises base stations 100, such as a node B (NB) or an evolved node B (eNB), capable of controlling radio communication and managing radio resources within a corresponding cell 102. Further, the eNB 100 may establish a connection with user equipment (UEs) 108 to 118, such as user terminals (UT), mobile cellular phones or any other apparatuses capable of operating in a mobile communication network. Let us assume that there is another cell 106 provided by another base station 104, which may be an eNB, a Home eNB (HeNB), a local cell access point (AP), for example. The second cell 106 may be at least partially overlapping with the first cell 102. Each of the UEs 110 to 118 may originally be camped on the cell 102, i.e. possibly communicating with the eNB 100.

It may be possible that some of the UEs advantageously exploit the radio communication capabilities of the second cell 106. Therefore, at least some of the UEs, such as the UEs 112 to 118, may be handed over to the cell 106 to utilise the spectrum of the cell 106 which may be simultaneously used by another, incumbent user. In such case, in order to avoid unnecessary interference to the incumbent users, an authorized shared access (ASA) is typically provided. The ASA is a complementary spectrum authorization scheme that may enable timely availability of harmonized spectrum for mobile broadband while ensuring predictable quality of service (QoS) for all rights holders. Accordingly, an ASA controller 120 may allow new users to access the (already licensed) spectrum with the obligation to protect the incumbent user. The access may be performed via cognitive radio capabilities of the UEs 112 to 118, for example. In another embodiment, the cell 106 is a conventional cell not controlled by the ASA controller 120.

However, even though the UEs 112 to 118 may be successfully handed over to the cell 106, there may be situations in which the previously available spectrum of the cell 106 disappears. This may require a fast "emergency" group handover or evacuation of the UEs 112 to 118 back to the previous cell 102 or to another cell in proximity. As such, a handover burst may be inevitable to neighboring at least one cell 102. In such scenarios, one of the key challenges may be how to ensure fast and robust HO of as many connected UEs of the source cell 106 to neighboring target cells 102 as possible. It is to be noted that due to urgent nature of cell evacuation, the speed of massive HO execution of the plurality of UEs 112 to 118 from the cell 106 to the overlapping or neighboring cell(s) 102 is important in order to ensure service continuity of as many active UEs 112 to 118 as possible. However, due to the massive group HO, the target eNB 100 may become overloaded with respect of, e.g., limited random access channel (RACH) and physical downlink control channel (PDCCH) resources, eNB 100 processing capacity for handling mass UEs' 112 to 118 HO requests, and backhaul link capacity for UE context exchange and data forwarding. Such group HO scenario may even override the load balancing aspects between the cells 102 and 106. In this light, it is to be noted that the current load-balancing based handover may not be fast and effective enough to cope with the urgent need of such cell evacuation.

Hence, there is proposed a target cell 102 initiated and controlled D2D cluster generation to facilitate the upcoming massive HO. The HO burst may happen, for example, in case of the cell 106 evacuation, on-the-fly cell 106 switching-off, cell split and/or cell merger for the purposes of energy-saving optimization, performance optimization, site-failure recovery, load balancing or group mobility. The purpose of the D2D cluster generation may be to delegate some controls and operations from the target eNB(s) 100 to the D2D cluster header. Thus the proposed embodiments may be seen as a form of cloud networking/computing among the target eNB(s) 100 and the D2D cluster heads to provide more efficient and robust group/massive HO solutions.

Figure 2:
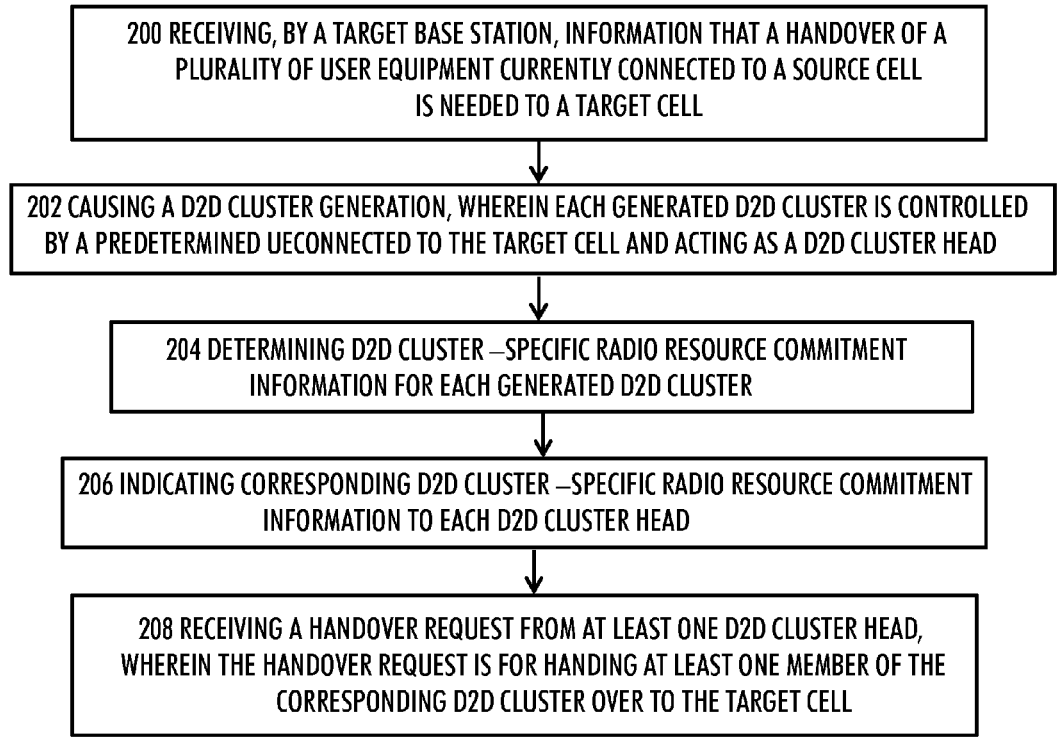
FIGS. 2 and 5 to 10 show methods, according to some embodiments.

As shown in FIGS. 1 and 2, the target eNB (or any base station) 100 may in step 200 receive information that a handover of a plurality of UEs currently connected to the source cell 106 is needed to the target cell 102. The request for the upcoming group handover (HO) burst may come from another network entity, e.g. the source eNB 104 or the ASA controller 120 in ASA cell evacuation scenario. For example, the detection of HO need may be due to the ASA controller 120 informing the eNBs 100, 104 that the available spectrum of the ASA cell 106 is to be used by a primary user system or that the ASA cell 106 is to be switched off. Thus, the UEs 112 to 118, currently served by the ASA cell 106, may need to be handed over to overlapping or neighboring target cell(s) 102. In another embodiment, the source eNB 104 may also make such decision by itself without any input from the ASA controller 120, for example, by detecting that available radio resources are insufficient. Thus, the request for the upcoming group HO may come directly from the source eNB 104.

In an embodiment, the HO request may be a blank indication without any load information of the source cell 106. In another embodiment, the HO request may include some information of the load of the source cell 106, such as the total load or a part of the load of the source cell 106, to be handed over to the target cell 102. In an embodiment, the HO request may be a group based HO request in which some information of the group is included, such as the number of UEs in the group or some/all UE's context(s). In an embodiment, the HO request may comprise multiple regular HO requests.

Further, in an embodiment, the source eNB 104 may group active UEs (such as UEs 114 to 118) which most likely have the same timing advance information for the group HO request. In general, the UEs of one group may have at least one of the following: the same priority according to predetermined criteria, QoS requirements of a pre-defined similarity, RB configurations of a predefined similarity, timing advances within a predefined interval, for example. UEs of predefined similarity may be then handed over in one group. This may advantageously save signaling resources, as, for example, the RACH process for acquiring the timing advance, need not be performed separately with each and every UE of the group.

In step 202, the target eNB 100 may cause/initiate a device-to-device (D2D) cluster generation. In addition to or instead of conventional communication links, the UEs of the D2D cluster may perform direct D2D communication. Each generated D2D cluster is controlled by a predetermined UE connected to the target cell 102 and acting as a D2D cluster head (CH). There are several ways to perform the cluster forming, including selecting at least one UE of the target cell 102 (i.e. connected to and served by the target eNB 100) or requesting the source eNB 104 to select at least one of the UEs of the source cell 106. In the latter case, the selected UE(s) may then be handed over to the target cell 102 first before the handover of the plurality of other UEs of the source cell 106 is performed. Let us look at this further later on with respect to FIGS. 4 to 6.

In step 204, the target eNB 100 may determine D2D cluster-specific radio resource commitment information for each generated D2D cluster. The D2D cluster-specific radio resource commitment information may also be called a "quota". It defines a designated commitment from the target cell eNB 100 for use by each D2D cluster. Thus, instead of a regular resource status report provided by target cell eNB 100 upon request of the source cell eNB 104, the D2D cluster specific "quota" may be used by the D2D CH to group, categorize and/or select different UEs currently connected to the source cell 106, as will be described. Thereafter, in step 206, the target eNB 100 may indicate the granted "quota" to each D2D CH. In an embodiment, the "quota" granted for one D2D cluster is independent of the "quota" granted to another D2D cluster. They may be different or they may be the same. In another embodiment, the granted "quota" is the same for each D2D cluster.

In an embodiment, each D2D cluster-specific radio resource commitment information (a.k.a. the "quota") defines at least one of the following: a maximum number of UEs acceptable by the corresponding D2D cluster, a maximum bit rate (e.g. maximum total/aggregated bit rate) guaranteed by the corresponding D2D cluster, a list of identifiers that the corresponding D2D cluster head is allowed to allocate to UEs joining corresponding D2D cluster. The list of identities/identifiers may be in the form of cell radio network temporary identifiers (C-RNTIs) that the D2D CH can allocate to cluster member UEs on behalf of target eNB 100. In an embodiment, the "quota" is valid for only a predetermined validity interval or lifetime. In this way part of the responsibilities typically associated to the target eNB 100 may be distributed or given to the selected D2D CH. In an embodiment, the "quota" information may be communicated to the respective D2D CH by the target eNB 100 directly via normal dedicated signaling or, alternatively, via a common signaling in case equal "quota" is granted to many D2D CHs. In another embodiment, the granted "quota" is informed via the source eNB 104 in case the D2D CH is selected among the active UEs 112 to 118 in the source cell 106.

From the point of view of the target eNB 100, the eNB 100 may later on, in step 208, receive a HO request from the at least one selected D2D CH. It should be noted that by this step 208, the selected D2D CH is already being served by the target eNB 100. The handover request may be for handing at least one member of the corresponding D2D cluster over to the target cell 102. Therefore, the D2D CH is given the responsibility to initiate a handover procedure for certain UEs which have joined the D2D cluster controlled by the respective D2D CH. This may be advantageous as then the source eNB 104 need not make the HO request regarding each UE to be handed over.

Figure 5:
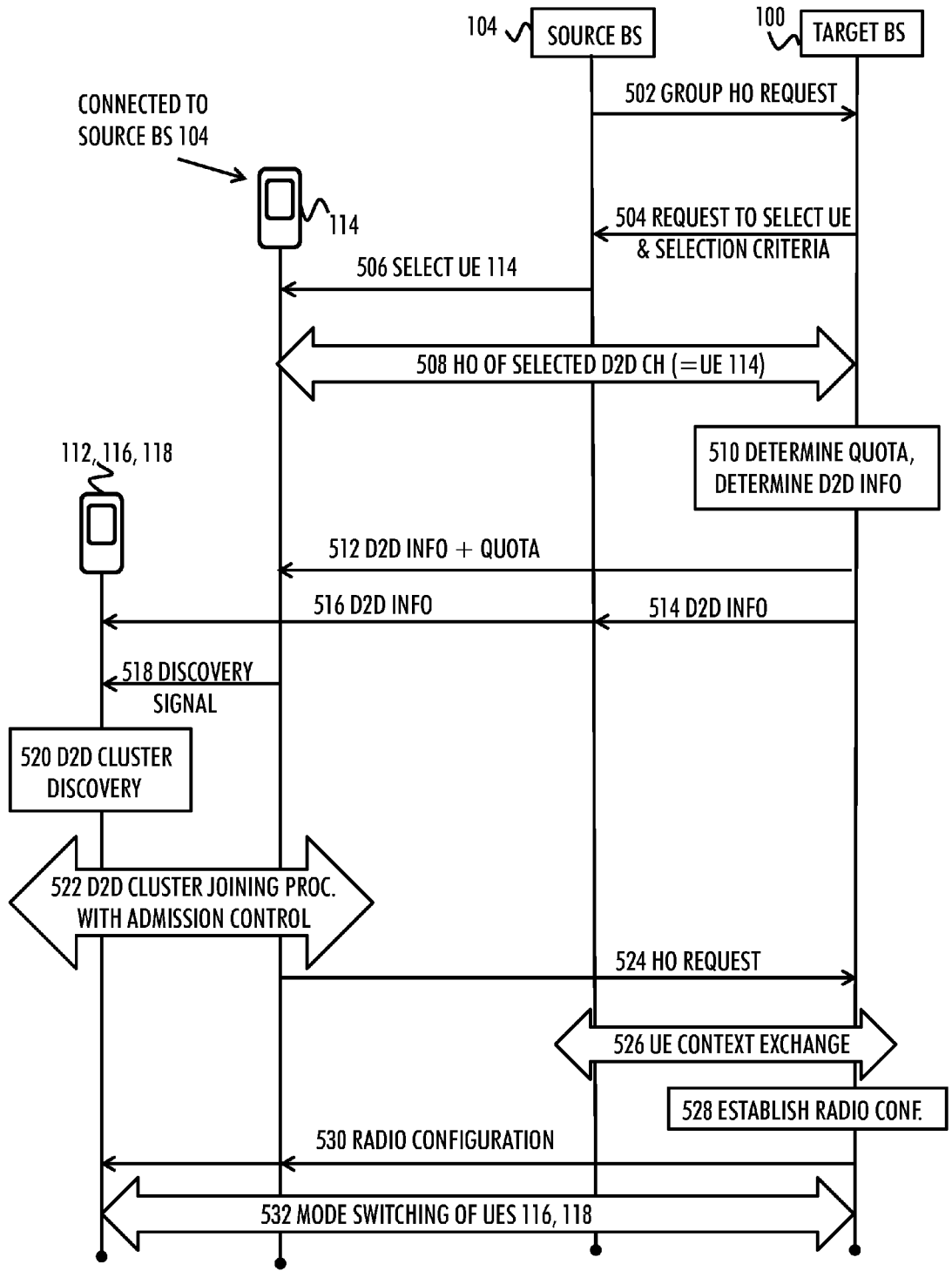
Figure 6:
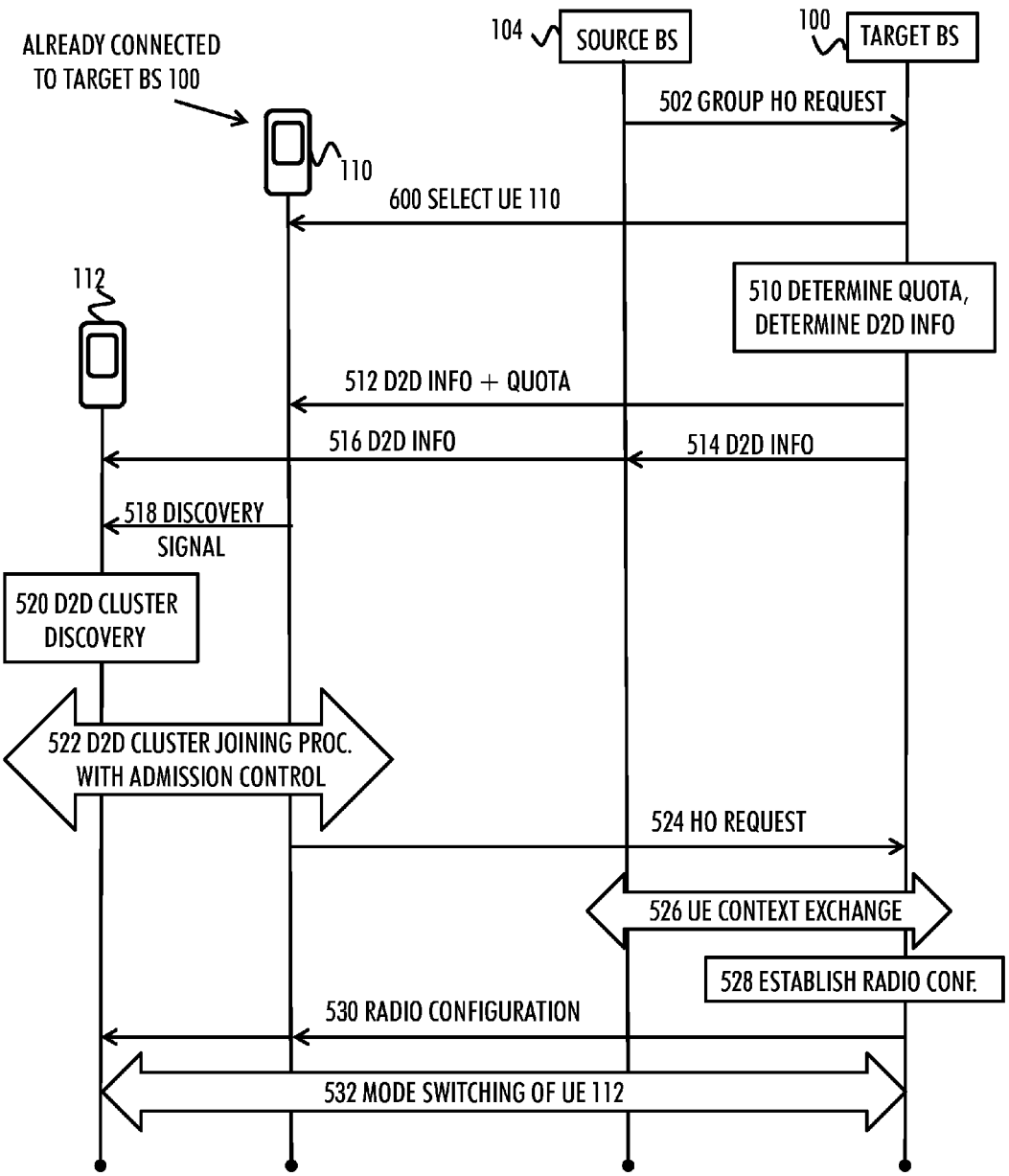

FIGS. 4 to 6 show closer on how the D2D clusters, each with one D2D CH, may be formed. Let us first look an embodiment given in FIG. 5 in which the source eNB 104 is given the responsibility to perform a guided selection of the D2D CH(s) from the UEs 112 to 118 currently served by the source eNB 104. The method starts in step 502 when the source eNB 104 (or another network element, such as the ASA controller 120) sends the group HO request to the target eNB 100, as indicated earlier. In step 504, the target eNB 100 may respond to the group HO request. The response may be an acknowledgment. The response may further carry a request to the source eNB 104 to select at least one UE 112 to 118 of the source cell 106 to act as the D2D CH(s). Further, the target eNB 100 may indicate selection criteria to the source eNB 104, wherein the selection of the at least one UE 112 to 118 is to be made on the basis of the indicated selection criteria. In this way the target eNB 100 may initiate the cluster formation by placing the request to select or proposing active UE(s) 112 to 118 of the source cell 106 to act as D2D CH(s). The request to select at least one UE among the UE(s) 112 to 118 of the source cell 106 may be indicated to the source eNB 104 via, e.g., the X2/S1 interface.

In an embodiment, the selection criteria comprises at least one of the following with respect the to-be-selected at least one UE 112 to 118: an identifier, required capabilities, a required priority status, required active service types, a required target cell downlink measurement result. For example, in one embodiment, the proposal of the source cell UE(s) 112 to 118 to act as D2D CH may be expressed explicitly by target eNB 100 giving the UE identifier (e.g. UE's C-RNTI being used in the source cell 106 or to be used in the target cell 102) to the source eNB 104. This may be the case if at least some corresponding mobile contexts of the source cell UE(s) 112 to 118 are available in the target eNB 100. Such contexts availability may be made in step 502, i.e. when the source eBN 104 places the group HO request to the target eNB 100, or in a dedicated signaling between the eNBs 104, 100. In one embodiment, the target eNB 100 may indicate that the selected UE(s) needs to have certain capabilities, such as cognitive capabilities. In one embodiment, the target eNB 100 may indicate that the selected UE(s) needs to have a certain priority class, such as a high priority status. In one embodiment, the target eNB 100 may indicate that the selected UE(s) needs to have certain active service classes, such as a best effort service or a real-time service. In one embodiment, the target eNB 100 may indicate that the to-be-selected UE(s) need to have a certain target cell downlink measurement result. E.g., only an UE with a high enough reference signal received power (RSRP), reference signal received quality (RSRQ), or received signal strength indication (RSSI) may be selected. Such instructions may allow the source eNB 104 to make the final selection on which of the UEs 112 to 118 to select and, consequently, to act as D2D CH(s).

Let us assume in the example of FIG. 5 that the source eNB 104 decides to select the UE 114 in step 506. As said, the selection may be guided by the target eNB 100: either the C-RNTI of the UE 114 is indicated to the source eNB 104, or the UE 114 fulfills the selection criteria indicated by the target eNB 100. As shown in FIG. 4 with the dashed arrows, the source eNB 104 first receives information from the target eNB 100 and then the source eNB 104 selects the UE 114. In an embodiment, if the "quota" information is determined by the target eNB 100 and included already in the message of step 504, the source eNB 104 may also inform the selected UE 114 about the granted "quota" for that selected D2D CH (=UE 114). It should be noted that the source eNB 104 may select more than one UE(s). For example, suitable selection may be the UE 114 and the UE 112. These UEs 112 and 114 are located in the opposite sides of the source cell 106. This may be advantageous as then these UEs 112 and 114 may form two clusters on different parts of the source cell 106. For example, it may be that the source cell 106 is so large that the UE 112 is not able to detect the D2D cluster controlled by the D2D CH 114. In such case it may be beneficial to allow the UE 112 to form its own D2D cluster, or join another cluster. However, for the sake of simplicity, let us assume that only the UE 114 is selected in the example of FIG. 5.

Those source cell UEs 114 selected to act as the D2D CH(s) may be commanded individually to hand over to the target cell 102 first before starting to advertise itself as one D2D CH and before the handover of the rest of the plurality of UEs 112, 116, and 118 is performed. Thus, the handover of the UE 114 may be performed in step 508 in a typical manner between the target eNB 100 and the source eNB 104. As a consequence, the D2D CH(s) are then being served by (i.e. connected to) the target eNB 100.

However, before a D2D cluster may be formed around the D2D CH 114, the surrounding UEs in proximity may need to be aware of the presence of the D2D CH 114 capable of D2D communication. In order to enable this, a D2D discovery process may be applied. Thus, in an embodiment, the target eNB 100 determines, in step 510, D2D cluster discovery information for enabling the discovery of each D2D CH by other UEs in the area. The determined D2D cluster discovery information comprises at least one of the following with respect to each D2D cluster: discovery signal information, advertising information, discovery channel information, priority information, D2D cluster operation mode. In other words, the D2D cluster discovery information communicated by the target eNB 100 to the source eNB 104 in step 514 may thus include the D2D CHs' beacon reference signal and advertising information, beacon channel information in frequency/time/code/space domain, the priorities for the other UEs to scan and join the detected D2D clusters, D2D cluster operation mode (e.g. whether only control plane or also user plane relay extension is supported via the D2D CH, whether the D2D cluster supports broadcasting/multicasting), etc. Further, in step 510, the target eNB 100 may determine the "quota" for each D2D cluster if it has not been determined before.

In an embodiment, the target eNB 100 may define a priority for each D2D CH so that the other UEs nearby may search for D2D CH(s) with higher priority first. In an embodiment, the priority setting may be linked with the granted "quota" in the way that a higher priority is given to the D2D CH with a bigger "quota", such as a larger number of acceptable UEs to join the D2D cluster.

Then, in step 512, the target eNB 100 may inform the selected D2D CH 114, which has been handed over to the target cell 102, about the D2D cluster discovery information (e.g. the to-be-used beacon signal characteristics) in order enable the D2D cluster head 114 to transmit the discovery signal according to the transmitted D2D cluster discovery information. Further, information about the granted "quota" of that specific D2D cluster (if not indicated before) is indicated to the D2D CH 114 via a common or dedicated control signaling in step 512. This is shown with a dash-dotted arrow between the source eNB 104 and the UE 114 in FIG. 4.

The D2D cluster discovery information may also be transmitted to the source eNB 104 via the X2/S1 interface in step 514 so that the source eNB 104 may in step 516 forward the D2D cluster discovery information to other UEs 112, 116 and 118 of the source cell 106 via common or dedicated control signaling. This may be done in order to instruct the other UEs 112, 116, 118 to discover D2D CH(s) 114. This is shown with solid arrows originating from the source eNB 104 in FIG. 4.

It should be noted that steps 512 and 514 may be omitted in case the step 510 is performed before the step 504 and the information is given to the source eNB 104 and to the selected UE(s) 114 already in steps 504 and 506. Likewise, the step 516 may in such case be made already after the step 504. Such D2D cluster discovery information and the "quota" may be embedded as an extension part in the response message 504 (HO Request ACK-message) to the HO request. Alternatively, the information may be sent as a dedicated message.

Now that the selected D2D CH 114 is connected to the target cell 102 and aware of the beaconing/advertising characteristics due to the D2D cluster discovery information received in step 506/512, the D2D CH 114 may start transmitting/broadcasting the discovery signal in step 518. This is shown with lines 400 next to the UE 114 in FIG. 4.

In step 520, the other UEs 112, 116, 118 may perform D2D cluster discovery process by listening to the discovery signal 400, which may be known to the UEs 112, 116, 118 due to the D2D cluster discovery information received in step 516. It may be that each UE 112, 116, 118 which is able to detect the discovery signal 400 (e.g. a beacon) may try to join the D2D cluster corresponding to the detected discovery signal. In an embodiment, the joining to the D2D cluster is performed for the purposes of the upcoming HO. Let us assume that the UEs 116 and 118 of the source cell 106 are close enough to detect the discovery signal 400 from the D2D CH 114. Let us further assume that the UE 112 does not detect the beacon signaling 400 due to the physical distance between the UEs 112 and 114.

Then in step 522, a D2D cluster joining process is performed. Joining the D2D cluster 402 may denote initiating a D2D communication mode from the point of view of the UEs 116 and 118. The D2D communication mode is different than a conventional communication mode in that user data between the UEs 114 and 116/118 need not go through the serving base station(s) 100, 104, but the UEs 114 and 116/118 may communicate directly. Thus, the transmission of the discovery signal 400 may result in a generation of a D2D cluster 402, as shown in FIG. 4. Each D2D cluster may comprise one or more UEs as D2D cluster members. The geographical size of the D2D cluster 402 may be at least partly defined by the transmission power used for the discovery signal 400, for example.

Further, as the D2D CH 114 is aware of the "quota", the D2D CH 114 may perform a primary admission control for the UEs 118, 116 in step 522 on behalf of the target eNB 100 on the basis of the granted "quota". In this way some of the responsibilities of the target eNB 100 are distributed to the D2D CH 114 to improve the efficiency of the group HO, for example. For example, the "quota" may define that only certain number of UEs are allowed to join the D2D cluster 402 controlled by the D2D CH 114.

In an embodiment, the D2D CH 114 may allocate identifiers to the joining UEs 116, 118 from a set of predetermined identifiers acquired from the target base station 100, as shown in FIG. 3. This embodiment may require that such list of identifiers 300 (e.g. an exclusive set of C-RNTIs) is indicated to the D2D CH 114 by the target eNB 100, e.g., in the temporarily allocated "quota" of step 506/512. Then, if an active UE 116/118 of the source cell 106 is allowed to join the D2D cluster 402 on the basis of the "quota", the D2D CH 114 may assign the UE 116/118 identifiers/identities (e.g. CRNTI #1 and #2) to be used in the target cell 102, as shown with a reference numeral 302.

After having accepted some UEs 116, 118 as the D2D cluster members, the D2D CH 114 may then in step 524 transmit a HO request to the target eNB 100 regarding the HO of at least one member 116/118 of the D2D cluster 402 from the source cell 106 to the target cell 102. The HO request may comprise at least one of the following: identifier/identity of the source cell 106, identifier/identity of the at least one member 116/118 in the source cell 106. This may be in order to allow the target eNB 100 to identify the UE's 116/118 context in case the context is already available in the target eNB 100. In case the context(s) are not available already in the target eNB 100, the source eNB 104 may, in step 526 upon request, transfer the respective UE contexts, such as required radio bearers, to the target eNB 100. The request of the contexts may be based on the indicated source cell 106 identity and UE's 116/118 C-RNTI used in the source cell 106.

In another embodiment, although not shown in FIGS. 5 and 6, the D2D CH 114 may transfer the UE contexts of the D2D cluster members associated with the HO request to the target eNB 100. This may be performed upon explicit request from the target eNB 100 or automatically, for example, in the HO request of step 524. Thus, the source eNB 104 need not use any resources for transmitting the UE contexts to the target eNB 100.

It should be noted that in an embodiment, the HO request in step 524 is for the HO of one single UE 116 or 118. However, in another embodiment, the D2D CH 114 may aggregate more than one HO requests of multiple UEs 116 and 118 into one message for sending to the target eNB 100.

In step 528, the target eNB 100 may establish radio configuration for the UEs 116/118. This may include configuring any required resources including the radio bearers (RBs) configuration on the basis of the acquired UE's context. In step 530, the target eNB 100 may communicate the established radio configuration to the at least one cluster member 116/118 via the D2D CH 114. Thus, the D2D CH 114 may receive and forward the indication about the established radio configuration for the at least one member 116/118 of the D2D cluster 402 to be handed over.

In an embodiment, the target eNB 100 may consider the timing advance (TA) for all the members 116, 118 in one D2D cluster 402 to be the same as the TA of the D2D CH 114 of the that D2D cluster 402. Therefore, at this phase, the TA information of the D2D CH 114 may also be indicated to the UEs 116/118 so that the UEs 116/118 are ready to access the target cell 102 with all the needed information. This may save random access channel (RACH) resources as each UE 114, 116, 118 is not required to perform the RACH procedure After this in step 532, the actual HO of the UEs 116/118 to the target eNB 100 may take place as mode switching from the D2D cluster mode to the conventional cellular mode. The UE 116/118 may hand over to the target cell 102 either at a predefined time instance or as commanded by D2D CH 114 or the target eNB 100.

Let us now look at the embodiment presented in FIG. 6. This embodiment is otherwise the same as the one in FIG. 5, except that the target eNB 100 performs the D2D cluster generation itself by selecting at least one UE 108, 110 of the target cell 102 (i.e. an UE currently served by the target eNB 100) to act as the D2D CH, instead of instructing the source eNB 104 to do so. This is shown with reference numeral 600. Let us assume that the target eNB 100 selects the UE 110 to act as the D2D CH, as shown also in FIG. 4 with a solid arrow between the target eNB 100 and the UE 110. The target eNB 100 may also inform the identity of the selected D2D CH 112 to the source eNB 104 as part of the D2D cluster discovery information, for example. The UE 110 may then start advertising itself as the D2D CH by broadcasting a D2D discovery signal 404. As a result, the UE(s) 112 detecting the discovery signal 404 may join a D2D cluster 406 controlled by the D2D CH 110. Otherwise, the process of FIG. 6 follows the process of FIG. 5. The reader should note that the same reference numerals in FIGS. 5 and 6 correspond to the same procedural functions. Further, it should be noted that the embodiments of FIGS. 5 and 6 may be combined at least when there are more than one D2D CHs selected. For example, some of the more than one D2D CHs is/are selected directly by the target eNB 100 and some other(s) is/are selected by the source eNB 104 as guided by the target eNB 100.

Figure 7:
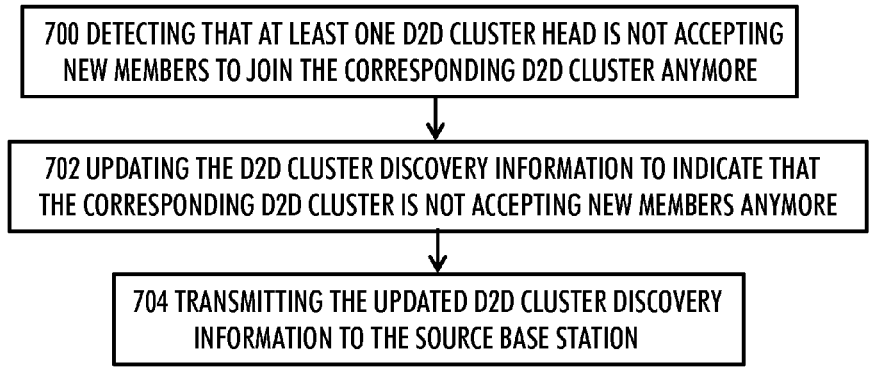

In an embodiment, as shown in FIG. 7, the target eNB 100 detects, in step 700, that that at least one D2D CH 114 is not accepting new members to join the corresponding D2D cluster 402 anymore. This detection may take place by the D2D CH 114 informing the target eNB 100 that the "quota" has run out or is about to run out. This may be the case, for example, when the D2D cluster is allowed to take ten members at maximum and all the ten members have already been approved as members of the D2D cluster. As a result, the target eNB 100 may, in step 702, update the D2D cluster discovery information to indicate that the corresponding D2D cluster 402 is not accepting new members anymore and transmit, in step 704, the updated D2D cluster discovery information to the source eNB 104. This may be advantageous as then the source eNB 104 may forward the updated D2D cluster discovery information to active UEs still served by the source cell 106. The UEs of the source cell 106 may use the information in future D2D cluster discovery. For example, the UEs of the source cell 106 may stop listening to/ignore the discovery signal from the corresponding D2D cluster 402. This may save resources from the UEs of the source cell 106.

Figure 8:
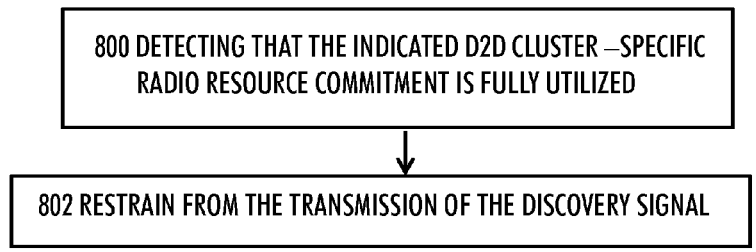

In an embodiment, as shown in FIG. 8, the UE 114 acting as the D2D CH may, in step 800, detect that the indicated D2D cluster-specific radio resource commitment (i.e. the granted "quota") is fully utilized (e.g. run out) or that the granted "quota" has expired. As a consequence of not being able to accept any new members to the corresponding D2D cluster 402, the D2D CH 114 may, in step 802, restrain from the transmission of the discovery signal. This may be advantageous in order to prevent surrounding UEs in the proximity to detect the discovery signal from the D2D CH 114.

Figure 9:
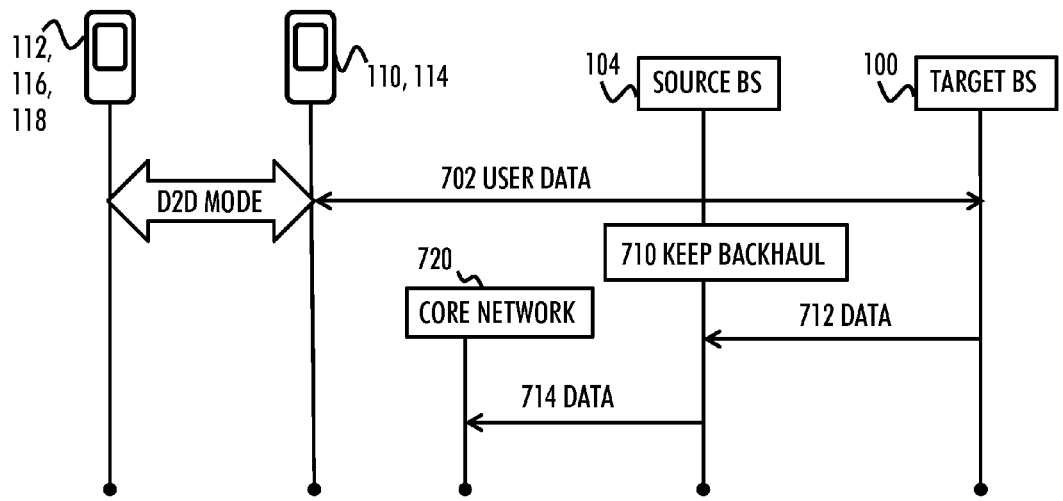

FIG. 9 shows an embodiment which may take place after the step 530 of FIGS. 5 and 6, for example. In this embodiment, the UEs 116, 118 may stay in the D2D cluster 402 (i.e. stay in the D2D mode) in case the D2D CH 114 and the target eNB 100 support U-plane relaying so that the UE's data traffic 702 is relayed by the D2D CH 114 to/from the target eNB 100. Thus, the D2D CH 114 may forward user data from the target cell 102 to at least one member of the D2D cluster 402.

In another embodiment, as further shown in FIG. 9, the source eNB 104 may keep a backhaul connection active in step 710 after radio services to the UEs 112 to 118 of the source cell 106 has been switched off. The backhaul connection may denote the S1/X2 backhaul connections and bearer services, for example. These backhaul connections may be kept alive for at least for a predetermined time interval. The source cell eNB 104 may utilize the running backhaul connection for routing data from the target cell eNB 100 to a core network 720, as shown with reference numerals 712, 714. This may be utilized for enhancing the group HO/cell evacuation: even after the radio operation is handed over to the target cell 102, the core part 720 may be kept and routed via the X2 extension between the source eNB 104 and the target eNB 100.

Figure 10:
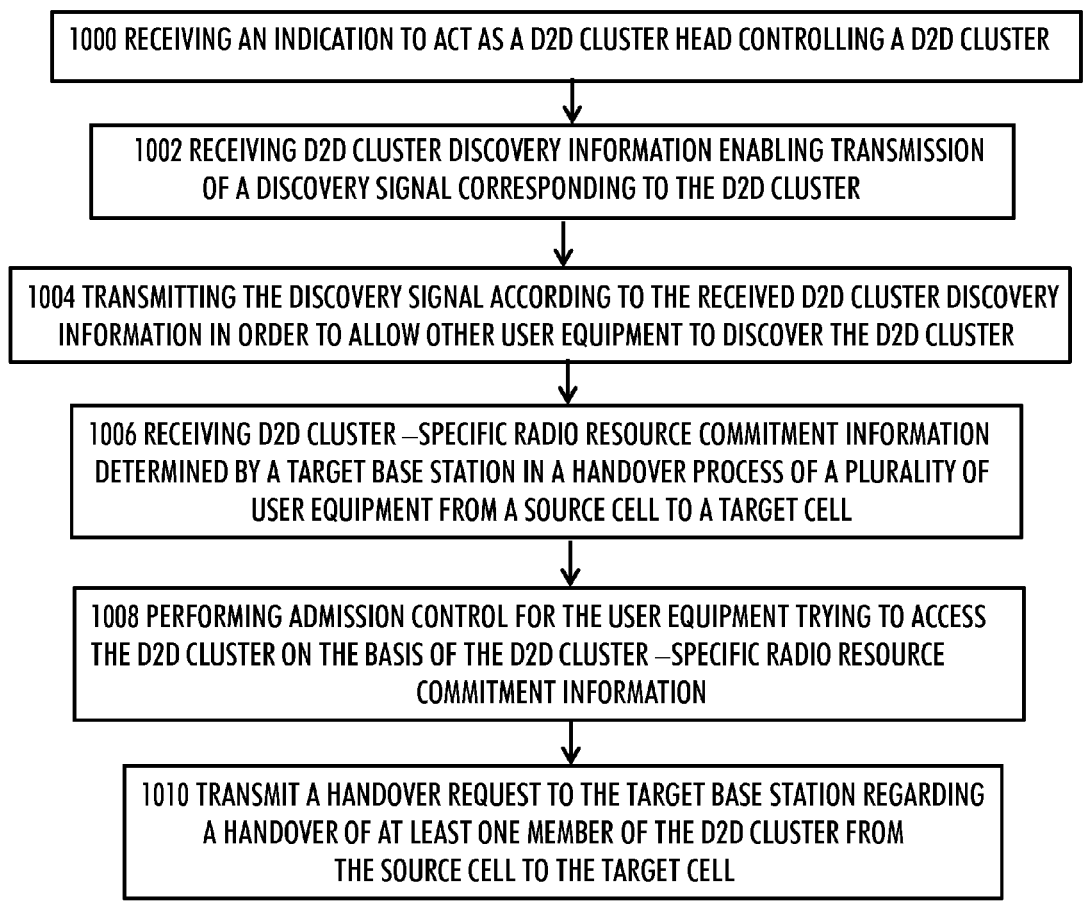

Looking from the point of view of the D2D CH, such as the UE 110 or 114, the D2D CH receives in step 1000 of FIG. 10 an indication to act as the D2D CH controlling a respective D2D cluster. As shown with respect to FIGS. 5 and 6, the indication/request may come from the source eNB 104 (FIG. 5) or from the target eNB 100 (FIG. 6). In step 1002, the D2D CH further receives D2D cluster discovery information enabling transmission of the discovery signal corresponding to the D2D cluster. In step 1004, the D2D CH transmits the discovery signal according to the received D2D cluster discovery information in order to allow other UEs in the proximity to discover the D2D cluster. In step 1006, which may take place simultaneously with the step 1002, the D2D CH may receive D2D cluster-specific radio resource commitment information, a.k.a. "quota", determined by the target eNB 100. Thereafter, the D2D CH may in step 1008 perform admission control for the UEs trying to access the D2D cluster on the basis of the granted "quota". Finally, in step 1010, the D2D CH may transmit a HO request to the target eNB 100 regarding a handover of at least one member of the D2D cluster from the source cell 106 to the target cell 102.

The proposed embodiments facilitating the group HO may advantageously enable that the each UE do not need to do individual RACH procedure in order to get access to the target cell 102. This may reduce the risk of RACH and PDCCH resource overload. In addition, most of the signaling over the X2/S1 and the air interface are group-wise ones on the D2D cluster basis. This may advantageously save signaling resources. Distribution of some HO control operations to the D2D CH(s) may also be helpful in releasing the burden of eNBs' processing capacity for handling massive HOs.

Further, unlike conventional "break-before-make" HO (even though a HO preparation phase in the current LTE HO procedures helps to reduce the HO delay, there is anyway a break between the UE disconnecting from the source cell and connecting to the target cell), the proposed group HO solution provides a "make-before-break" handover thanks to the target cell controlled D2D framework. This is because, the UEs to be handed over may stay connected with the source cell 106 when the UEs join the D2D cluster and is able to communicate with the target cell 102 via the D2D cluster. As said earlier, even when the UEs stay in the D2D cluster (D2D mode), the UEs may still be able to exchange some user data traffic (possibly with a down-graded quality of service) via the D2D CH of the D2D cluster to the network. The UEs may then enjoy full services after they switch to the target cell 102 from the D2D cluster.

Figure 11:
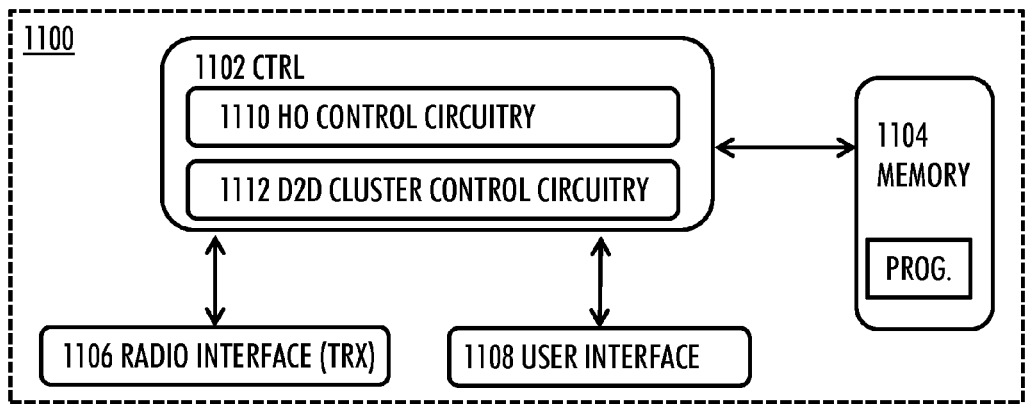
FIGS. 11 to 13 show apparatuses, according to some embodiments.
Figure 12:
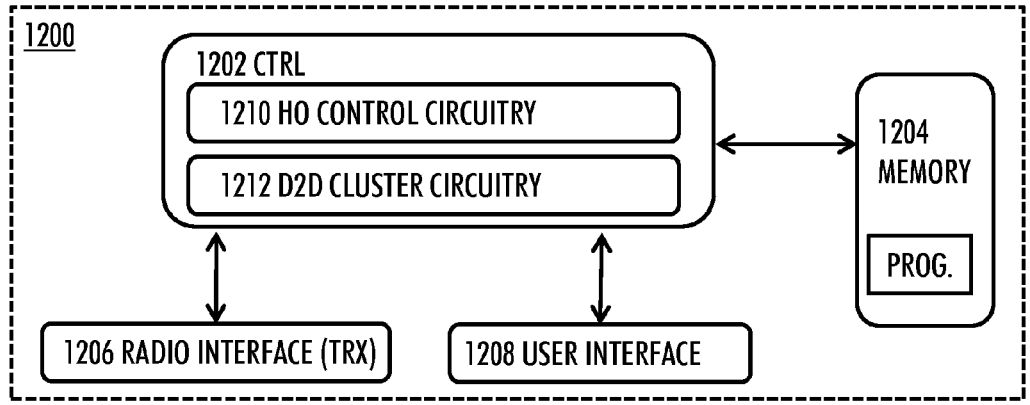
Figure 13:
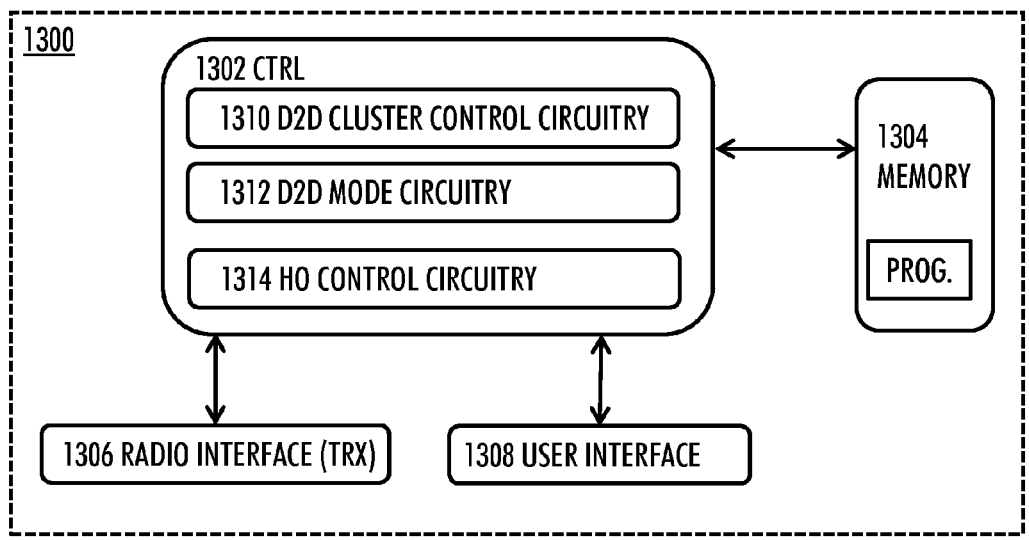

FIGS. 11 to 13 provide apparatuses 1100, 1200, and 1300 comprising a control circuitry (CTRL) 1102, 1202, 1302, such as at least one processor, and at least one memory 1104, 1204, 1304 including a computer pro-gram code (PROG), wherein the at least one memory and the computer pro-gram code (PROG), are configured, with the at least one processor, to cause the respective apparatus to carry out any one of the embodiments described. It should be noted that FIGS. 11, 12, and 13 show only the elements and functional entities required for understanding a processing systems of the apparatuses.

Each of the apparatuses may, as said, comprise a control circuitry 1102, 1202, 1302, respectively, e.g. a chip, a processor, a micro controller, or a combination of such circuitries causing the respective apparatus to perform any of the embodiments of the invention. Each control circuitry may be implemented with a separate digital signal processor provided with suitable software embedded on a computer readable medium, or with a separate logic circuit, such as an application specific integrated circuit (ASIC). Each of the control circuitries may comprise an interface, such as computer port, for providing communication capabilities. The respective memory may store software (PROG) executable by the corresponding at least one control circuitry. The memories may be implemented using any suitable data storage technology, such as semiconductor based memory devices, flash memory, magnetic memory devices and systems, optical memory devices and systems, fixed memory and removable memory.

The apparatuses may further comprise radio interface components (TRX) 1106, 1206, 1306 providing the apparatus with radio communication capabilities with the radio access network and user interfaces 1108, 1208, 1308 comprising, for example, at least one keypad, a micro-phone, a touch display, a display, a speaker, etc., for controlling the respective apparatus by the user.

In an embodiment, the apparatus 1100 may be or be comprised in a base station (also called a base transceiver station, a Node B, a radio network controller, or an evolved Node B, for example). In an embodiment, the apparatus 1100 is or is comprised in the base station 100 of the target cell 102.

The control circuitry 1102 may comprise a HO control circuitry 1110 for performing the functionalities related to the HO of UE(s), according to any of the embodiments. A D2D cluster control circuitry 1112 may be, e.g., for determining the "quota", the D2D cluster discovery information, selecting the D2D CH or instructing the source eNB 104 to select the D2D CH.

In an embodiment, the apparatus 1200 may be or be comprised in a base station (also called a base transceiver station, a Node B, a radio network controller, or an evolved Node B, for example). In an embodiment, the apparatus 1200 is or is comprised in the base station 104 of the source cell 106.

The control circuitry 1202 may comprise a HO control circuitry 1210 for performing the functionalities related to the HO of UE(s), according to any of the embodiments. A D2D cluster circuitry 1212 may be for selecting the D2D CH according to the instructions from the target eNB 100, transmitting discovery information to the UEs of the source cell 106, for example.

In an embodiment, the apparatus 1300 may comprise the terminal device of a cellular communication system, e.g. a computer (PC), a laptop, a tabloid computer, a cellular phone, a communicator, a smart phone, a palm computer, or any other communication apparatus. Alternatively, the apparatus 1200 is comprised in such a terminal device. Further, the apparatus 1300 may be or comprise a module (to be attached to the apparatus) providing connectivity, such as a plug-in unit, an "USB dongle", or any other kind of unit. The unit may be installed either inside the apparatus or attached to the apparatus with a connector or wirelessly. In an embodiment, the apparatus 1300 may be, comprise or be comprised in a user equipment selected to act as the D2D cluster head, such as the UE 110 or 114, for example.

The control circuitry 1302 may comprise a D2D cluster control circuitry 1310 for performing the functionalities related to the D2D cluster, such as transmission of the discovery signal, performing admission control on the basis of the "quota", for example. A D2D mode circuitry 1312 may be for performing functionalities related to communication within the D2D cluster, such as transfer of data between the apparatus and one or more members of the D2D cluster, transfer of data to/from the target cell 102, for example. Further, A HO control circuitry 1314 may be for performing functionalities related to HO of at least one UE, such as transmission of the HO request to the target eNB 100, conveying of radio configurations from the target eNB 100 to the member UEs of the D2D cluster, performing mode switching of the member UEs from the D2D mode to the conventional cellular mode.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method at a user equipment for a group handover, comprising:
    receiving an indication to act as a device-to-device (D2D) cluster head controlling a D2D cluster from a base station (BS);
    receiving D2D cluster discovery information enabling transmission of a discovery signal corresponding to the D2D cluster from the BS;
    transmitting the discovery signal according to the received D2D cluster discovery information in order to allow other user equipment to discover the D2D cluster;
    receiving D2D cluster-specific radio resource commitment information determined by a target BS in a handover process of a plurality of user equipment from a source cell to a target cell;
    performing admission control for the user equipment trying to access the D2D cluster on the basis of the received D2D cluster-specific radio resource commitment information; and
    transmitting a handover request to the target BS regarding a handover of at least one member of the D2D cluster from the source cell to the target cell.

2. The method of claim 1, wherein the radio resource commitment information indicates a quota by which the D2D cluster head determines whether a user equipment connected to the source cell is to be included in the D2D cluster, and
    wherein performing admission control for the user equipment trying to access the D2D cluster on the basis of the received D2D cluster-specific radio resource commitment information includes determining whether a user equipment connected to the source cell is to be included in the D2D cluster based on the quota indicated by the radio resource commitment information.

3. An apparatus in a target base station (BS), comprising:
    at least one processor and
    at least one memory including a computer program code, wherein the at least one memory and the computer program code are configured, with the at least one processor, to cause the apparatus at least to:
    receive information that a handover of a plurality of user equipment currently connected to a source cell is needed to a target cell;
    generate a device-to-device, D2D, cluster generation, wherein each generated D2D cluster is controlled by a predetermined user equipment connected to the target cell and acting as a D2D cluster head;
    determine D2D cluster-specific radio resource commitment information for each generated D2D cluster;
    indicate corresponding D2D cluster-specific radio resource commitment information to each D2D cluster head; and
    receive a handover request from at least one D2D cluster head, wherein the handover request is for handing at least one member of the corresponding D2D cluster over to the target cell.

4. The apparatus of claim 3, wherein each D2D cluster-specific radio resource commitment information defines at least one of the following: a maximum number of user equipment acceptable by the corresponding D2D cluster, a maximum bit rate guaranteed by the corresponding D2D cluster, a list of identities that the corresponding D2D cluster head is allowed to allocate to user equipment joining the corresponding D2D cluster.

5. The apparatus of claim 3, wherein the at least one memory and the computer program code are configured, with the at least one processor, to cause the apparatus further to:
    perform the D2D cluster generation by selecting at least one user equipment of the target cell to act as the D2D cluster head; and
    transmit an indication of the selected at least one D2D cluster head to the source BS.

6. The apparatus of claim 3, wherein the at least one memory and the computer program code are configured, with the at least one processor, to cause the apparatus further to:
    perform the D2D cluster generation by transmitting a request to the source base station to select at least one user equipment of the source cell to act as the D2D cluster head, wherein the selection is to be made on the basis of selection criteria indicated to the source base station; and
    perform a handover of the selected at least one user equipment from the source cell to the target cell before the handover of the plurality of user equipment.

7. The apparatus of claim 3, wherein the at least one memory and the computer program code are configured, with the at least one processor, to cause the apparatus further to: determine D2D cluster discovery information for enabling a discovery of each D2D cluster head;
    transmit corresponding D2D cluster discovery information to the corresponding D2D cluster head in order to enable the D2D cluster head to transmit the discovery signal according to the transmitted D2D cluster discovery information; and
    transmit the D2D cluster discovery information to a source base station in order to enable the source base station to indicate the D2D cluster discovery information to the plurality of user equipment of the source cell.

8. The apparatus of claim 7, wherein the D2D cluster discovery information comprises at least one of the following with respect to each D2D cluster: discovery signal information, advertising information, discovery channel information, priority information, D2D cluster operation mode.

9. The apparatus of claim 7, wherein the at least one memory and the computer program code are configured, with the at least one processor, to cause the apparatus further to:
    detect that at least one D2D cluster head is not accepting new members to join the corresponding D2D cluster anymore;

update the D2D cluster discovery information to indicate that the corresponding D2D cluster is not accepting new members anymore; and cause a transmission of the updated D2D cluster discovery information to the source base station.

10. The apparatus of claim 3, wherein the handover request comprises at least one of the following: identifier of the source cell, identifier of the at least one member, and the at least one memory and the computer program code are configured, with the at least one processor, to cause the apparatus further to:

establish radio configuration for the at least one member to be handed over and indicating the established radio configuration to the at least one member via the D2D cluster head.

11. The apparatus of claim 3, wherein the at least one memory and the computer program code are configured, with the at least one processor, to cause the apparatus further to:

perform mode switching for the at least one member of the D2D cluster from a D2D mode to a conventional cellular mode.

12. An apparatus in a source base station (BS), comprising: at least one processor and at least one memory including a computer program code, wherein the at least one memory and the computer program code are configured, with the at least one processor, to cause the apparatus at least to:

receive device-to-device, D2D, cluster discovery information from a target BS in a handover process of a plurality of user equipment from a source cell to a target cell, wherein the D2D discovery information indicates discovery of at least one predetermined user equipment connected to the target cell and the predetermined user equipment acts as a D2D cluster head controlling a corresponding D2D cluster; and transmit the D2D cluster discovery information to the plurality of user equipment currently connected to the source cell.

13. The apparatus of claim 12, wherein the at least one memory and the computer program code are configured, with the at least one processor, to cause the apparatus further to:

receive a request from the target BS to select at least one user equipment of the source cell to act as a D2D cluster head;

select the at least one user equipment of the source cell on the basis of selection criteria, wherein the selection criteria are obtained from the target BS; and perform a handover of the selected at least one user equipment from the source cell to the target cell before the handover of the plurality of user equipment.

14. The apparatus of claim 13, wherein the selection criteria comprises at least one of the following with respect the to-be-selected at least one user equipment: an identifier, required capabilities, a required priority status, required active service types, a required target cell downlink measurement result.

15. The apparatus of claim 12, wherein the at least one memory and the computer program code are configured, with the at least one processor, to cause the apparatus further to:

keep a backhaul connection active after radio services to the user equipment of the source cell has been switched off; and utilize the backhaul connection for routing data between the target cell and core network.

16. An apparatus at a user equipment for a group handover, comprising: at least one processor and at least one memory including a computer program code, wherein the at least one memory and the computer program code are configured, with the at least one processor, to cause the apparatus at least to:

receive an indication to act as a device-to-device, D2D, cluster head controlling a D2D cluster from a base station (BS);

receive D2D cluster discovery information enabling transmission of a discovery signal corresponding to the D2D cluster from a base station (BS);

transmit the discovery signal according to the received D2D cluster discovery information in order to allow other user equipment to discover the D2D cluster;

receive D2D cluster-specific radio resource commitment information determined by a target BS in a handover process of a plurality of user equipment from a source cell to a target cell;

perform admission control for the user equipment trying to access the D2D cluster on the basis of the received D2D cluster-specific radio resource commitment information; and transmit a handover request to the target BS regarding a handover of at least one member of the D2D cluster from the source cell to the target cell.

17. The apparatus of claim 16, wherein the D2D cluster-specific radio resource commitment information defines at least one of the following: a maximum number of user equipment acceptable by the D2D cluster, a maximum bit rate guaranteed by the D2D cluster, a list of identities that the D2D cluster head is allowed to allocate to a user equipment joining the D2D cluster.

18. The apparatus of claim 16, wherein the at least one memory and the computer program code are configured, with the at least one processor, to cause the apparatus further to:

allocate an identifier to each user equipment joining the D2D cluster from a set of predetermined identifiers acquired from the target base station.

19. The apparatus of claim 16, wherein the at least one memory and the computer program code are configured, with the at least one processor, to cause the apparatus further to:

detect that the indicated D2D cluster-specific radio resource commitment is fully utilized; and restrain from the transmission of the discovery signal.

20. The apparatus of claim 16, wherein the at least one memory and the computer program code are configured, with the at least one processor, to cause the apparatus further to:

transfer at least part of the contexts of the user equipment associated with the handover request to the target base station.

* * * * *